United States Patent [19]

Wally, Jr.

[11] Patent Number: 4,473,291

[45] Date of Patent: Sep. 25, 1984

[54] SUPPORT ARRANGEMENT FOR TRACK MOUNTED CAMERAS, PROJECTORS AND CAMERA/PROJECTORS

[75] Inventor: Joseph H. Wally, Jr., Shawnee Mission, Kans.

[73] Assignee: Opti-Copy, Inc., Lenexa, Kans.

[21] Appl. No.: 478,210

[22] Filed: Mar. 24, 1983

[51] Int. Cl.³ .............................................. G03B 27/00
[52] U.S. Cl. ....................................... 355/18; 355/55; 104/107; 238/281
[58] Field of Search ....................... 355/18, 55; 104/94, 104/106, 107, 116; 238/172, 174, 235, 281

[56] References Cited

U.S. PATENT DOCUMENTS

| | | | |
|---|---|---|---|
| 293,451 | 2/1884 | Grosscup | 104/107 |
| 311,254 | 1/1885 | Nickerson | 238/281 |
| 589,247 | 8/1897 | Cooper | 238/172 |
| 670,207 | 3/1901 | Miller | 104/107 |
| 2,402,107 | 6/1946 | Wekeman | 355/18 |
| 3,639,054 | 2/1972 | Wally | 355/55 |
| 3,645,621 | 2/1972 | Wally | 355/73 |
| 3,724,948 | 4/1973 | Wally et al. | 355/55 |
| 3,762,816 | 10/1973 | Wally | 355/73 |

Primary Examiner—Monroe H. Hayes
Attorney, Agent, or Firm—Kokjer, Kircher, Bradley, Wharton, Bowman & Johnson

[57] ABSTRACT

In a large, track mounted industrial camera or projector, a leveling arrangement for maintaining the track rails level when their support beams deflect under the influence of the weight of the camera and the rail mounted carriage which carries the camera toward a subject holder at one end of the track. Each rail is mounted on a rail base held down on the underlying support beam by a series of hold down screws. Adjustment screws are threaded through the rail bases and rest on the beams at their lower ends to control the distance of the rail bases above the beams. Each adjustment screw can be independently adjusted to compensate for beam deflection under actual loading conditions and for the variation in beam deflection along the length of the track. The overall track structure is stiffened to reduce beam deflection by an internal cable support structure secured to the rails and by a canopy secured to the beams.

20 Claims, 8 Drawing Figures

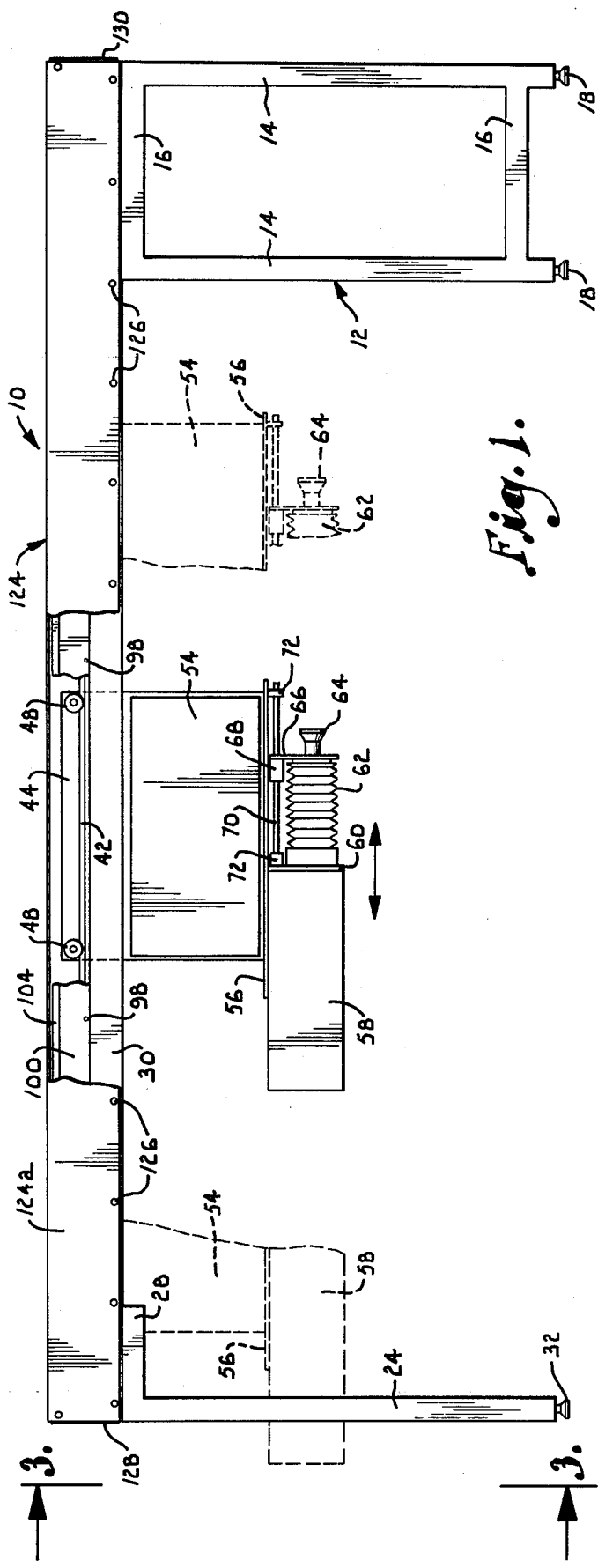
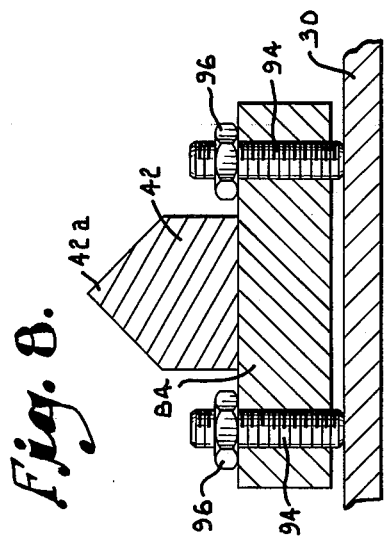
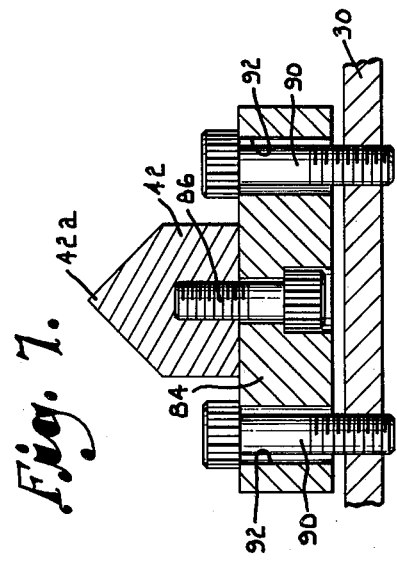

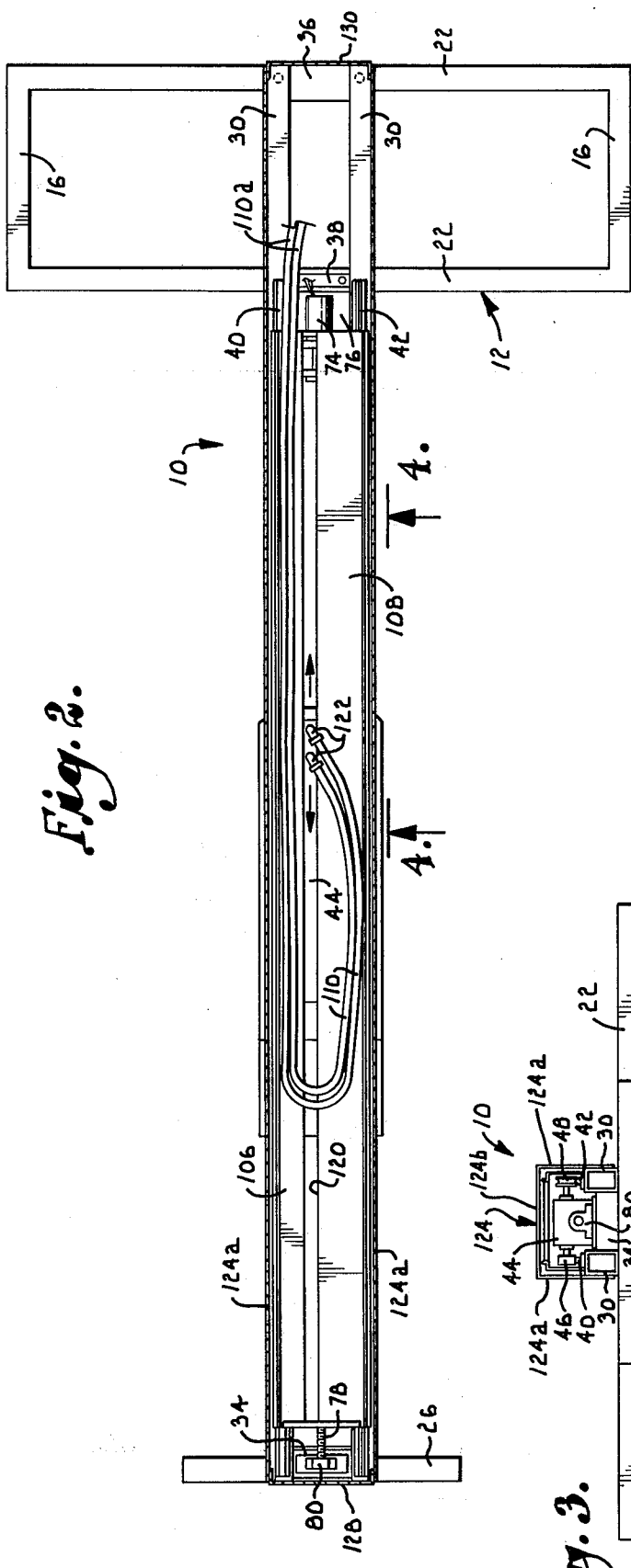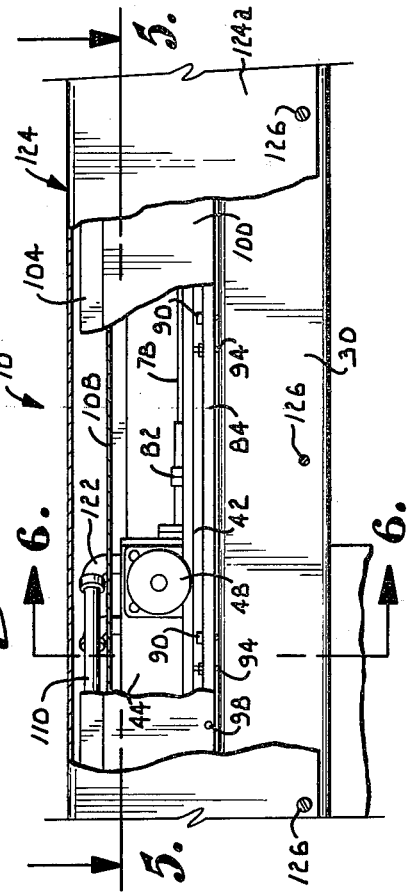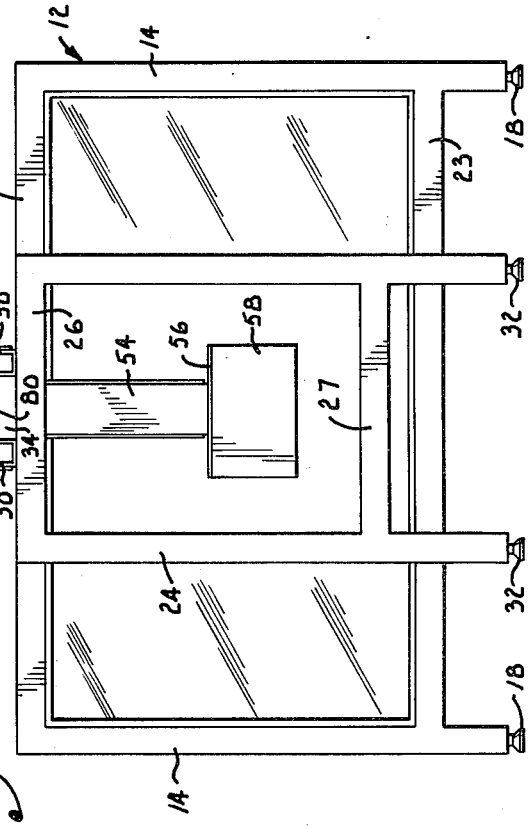

SUPPORT ARRANGEMENT FOR TRACK MOUNTED CAMERAS, PROJECTORS AND CAMERA/PROJECTORS

BACKGROUND OF THE INVENTION

This invention relates in general to photography equipment such as large, high precision cameras and deals more particularly with an improved track structure, usually overhead, for supporting large copying cameras and projectors.

In the graphic arts and reprographic fields, large cameras, projectors, and camera/projectors are used for negative making, plate making, print duplication, enlargements and other complicated functions such as lithographic press printing. The camera reproduces original material on a photosensitive medium, usually film. If the device functions as a projector, it projects the image (after the film has been processed) at its original size or at a different size if desired. Large cameras and projectors of this type are also used in reprographic work such as the preparation of engineering and architectural drawings and maps, and in other specialized areas such as seismic studies and printed circuit manufacturing. In these applications, the cameras and projectors are used to make intermediate photo tracings as well as end use (display) prints.

Modern cameras and projectors of this type are equipped with a subject holder which receives and holds the original drawings and other materials that are to be reproduced. In the projection mode of operation, the subject holder technically functions as an easel. The subject holder is located at one end of an overhead track having machined rails on which a wheeled carriage travels. The camera or projector is suspended from the carriage and can be moved toward and away from the subject holder by moving the carriage along the rails.

Any camera exposure requires a holder for sensitized material, an objective lens and an object (or subject holder). In focusing and sizing an image in the camera or projector relationship, it is always necessary to move at least two of the above three items with respect to the third item.

Traditionally, the film plane or lensboard is held stationary and the subject holder is nearly always one of the two components that is moved during the focusing and sizing of the image. Improved arrangements which involve fixedly locating the subject holder and moving the other optical components are shown in the patents to J. H. Wally, Jr. U.S. Pat. No. 3,639,054, issued Feb. 1, 1972; U.S. Pat. No. 3,645,621, issued Feb. 29, 1972; U.S. Pat. No. 3,724,948, issued Apr. 3, 1973; and U.S. Pat. No. 3,762,816, issued Oct. 2, 1973. Among the advantages of this type of arrangement is the ability to position the front and back lights in the most effective position and maintain the lights in such position without the need to move them or change their attitude.

Due to the size of many original drawings, the subject holder is often 12 feet long or longer. The need for such a large subject holder, coupled with the need to make size reductions with appropriate objective lenses, results in a track length of 30 feet or more in some cases.

In order to keep the floor as uncluttered as possible and to enhance the speed and safety of the operation, the support tracks are normally overhead structures which are supported only at the ends. A track supported only at the ends is highly susceptible to bending or sagging, particularly if it is a long track and is loaded with an optical compartment containing heavy components such as metal film holders, massive glass condensers, or in some cases, a moving subject holder and the lighting means associated therewith. The equipment which is borne by the track can weigh hundreds or even thousands of pounds, and this weight can deflect the track considerably, especially when the load is applied near the center of the track.

Bending of the overhead track under load is highly undesirable because it deflects the optical axis which extends through the center of the lens, thereby introducing distortion into the film image and detracting from the geometric accuracy of the reproduction. In this type of camera, accurate reproduction is of paramount importance because it is necessary to reproduce the original material with opposite borders parallel, corners square and free of unnecessary distortion in the field of the image.

In the past, various types of specially and massively constructed tracks have been proposed in attempts to counteract the heavy weights that are applied to the track and to negate the deflection of the optical components with respect to the optical axis. The long prevailing arrangement has been a welded track structure having rails which are machined to a straight and flat condition after construction of the track. The machine work is carried out in a plant on a large machine tool or mill. Although the rails can be machined to a precisely straight and flat condition in the mill, this construction does not compensate for the heavy loads that the rails must carry in actual use, and there is no way to simulate those loads during the milling procedure.

The track deflection varies both with the load and with the position of the load along the track. Near the center of the track span, the deflection is greatest. Near the ends of the track, the support posts or frames bear more of the load and the track deflection diminishes. None of the tracks which have been proposed in the past, once erect and in use, have been able to compensate for these complex effects, and the precision of the photographic or projection process has suffered accordingly. The overall stiffness of the overhead beams cannot, in and of itself, prevent deflection.

SUMMARY OF THE INVENTION

The present invention is directed to an improved track structure and has, as its primary object, the provision of an overhead support track having rails which can be adjusted under load to a perfectly straight and level condition. This is accomplished by making the rails independently adjustable with respect to the beam structure which supports them. Consequently, the rails can be leveled and made straight after assembly and in actual use so that the optical axis of the objective lens, film holder and source light are likewise straight and level at all positions along the length of the track, and remain at right angles to the subject holder/easel. The manufacture of highly precise overhead track is thus easier and less expensive than in the past, and, for the first time, optical tooling and alignment of the beam can be carried out at the installation site, as well as at the factory where it is made. The latter advantage is highly important because the disassembly and reerection of a large industrial camera or projector destroys the alignment and calibration, and it is necessary to reconstitute both the alignment and calibration at the installation site with great care, skill and expenditure of time in order to restore accuracy and assure lack of distortion in the finished images.

Another object of the invention is to provide an overhead support track in which compensation is made for the tendency for the track deflection to vary along the length of the track. The adjustment screws are spaced along the track so that the rails can be raised more near the center in order to counteract the greater deflection near the center, or raised or lowered wherever such change is needed. By properly adjusting the screws, the optical axis of the camera or projector can be maintained perfectly level as the carriage travels along the rails. The end result is a more accurate configuration.

Yet another object of the invention is to provide, in an overhead support track of the character described, rail bases that function to support the rails and to readily accommodate both the adjustment screws and hold down screws that are used to hold the rails down on the beams.

A further object of the invention is to provide an overhead track having an especially stiff construction in order to minimize downward deflection under heavy loads. The beams which support the track are rigidly connected with, and their strength is supplemented by, a canopy which stiffens the overall beam structure and which includes a top plane that resists compressive forces in order to resist beam deflection. The rails themselves also connect with a cable support structure which further stiffens the beams and offers additional resistance to deflection, because it too has a top surface which resists compression. The cable support additionally provides a low friction surface on which power cables can slide as the carriage moves back and forth on the track.

An additional object of the invention is to provide an overhead track which is constructed to permit the camera or projector to be suspended centrally on the optical axis between the beams. In the past, complicated outboard support structures have been required to extend outwardly of the beams and downwardly to carry the optical package from the outside. These structures, primarily because of their complexity, are expensive to build and are structurally weak. When the carriage is suspended centrally, directly downward from between the beams, it achieves greater stability, is less expensive and the styling is cleaner.

A still further advantage resulting from hanging the optical components centrally between the rails is that the rails can be situated together so that the axles can be made relatively short to reduce their tendency to bend under the weight they carry. At the same time, the bearings can be located close to the wheels to further resist the tendency of the axles to bend.

In order to provide the necessary clearance for conventional carriages, anti-sway bars at the end of the track, made as part of the support posts or legs, have necessarily pointed rearwardly or away from the subject holder, necessitating extra beam length. These anti-sway elements function as gussets. In contrast, suspension of the optical instrument between the beams in the present invention permits the anti-sway elements to point forwardly toward the subject holder, thus giving the track the necessary operating length without requiring additional space. This is because the carriage can travel between the legs and anti-sway components without the carriage top striking the upper cross member of the support leg assembly. This saves track length equal to the length of the anti-sway components.

Still another object of the invention is to maintain the optical compartment carriage (or other moving assembly) inherently "tracking" straight; i.e., to constantly maintain the optical axis as close as possible to a perpendicular relationship with the face of the subject holder and keep it from "crabbing" as it moves. This is achieved by keeping the front and rear v-grooved wheels as far apart as is practical and the distance between the wheels on the same axle as short as possible. This construction avoids the need to make a wide, elaborate, outboard carriage which invites deflection in its own structure. The total weight of the optical housing is hung straight down below the track center, and the center of gravity is totally suspended immediately below the geometrical center of the rails and beam assembly.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a side elevational view of a large track-mounted camera/projector constructed according to a preferred embodiment of the present invention, with portions broken away for purposes of illustration and the broken lines showing alternative positions of the camera along the overhead track;

FIG. 2 is a top plan view of the camera shown in FIG. 1, with the top of the canopy of the track structure broken away for purposes of illustration;

FIG. 3 is an end elevational view of the camera taken generally along line 3—3 of FIG. 1 in the direction of the arrows, with the end panel of the canopy removed;

FIG. 4 is a fragmentary elevational view on an enlarged scale taken generally along line 4—4 of FIG. 2 in the direction of the arrows, with portions broken away for illustrative purposes;

FIG. 7 is a fragmentary sectional view on an enlarged scale taken generally along line 7—7 of FIG. 5 in the direction of the arrows; and FIG. 8 is a fragmentary sectional view taken generally along line 8—8 of FIG. 5 in the direction of the arrows.

DETAILED DESCRIPTION OF THE INVENTION

Figure 5:
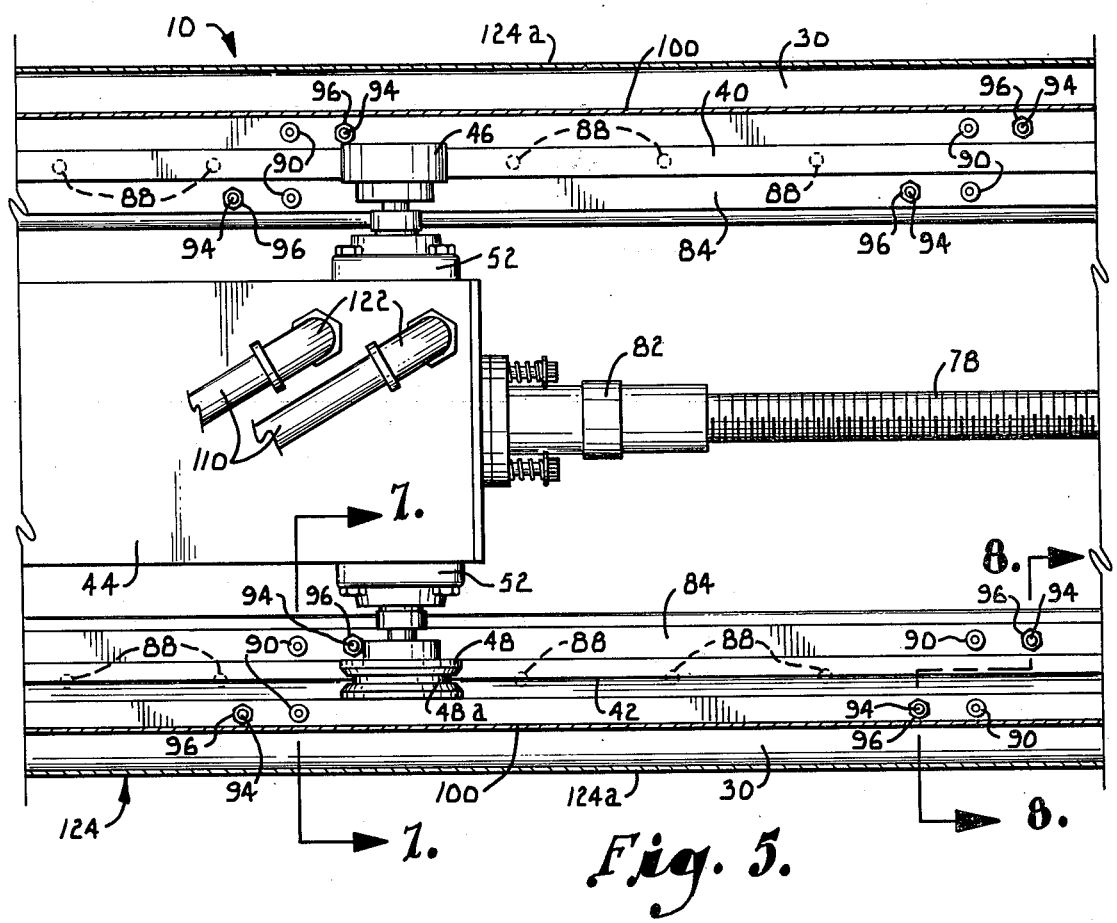
FIG. 5 a fragmentary sectional view on an enlarged scale taken generally along line 5—5 of FIG. 4 in the direction of the arrows.

Referring now to the drawings in more detail and initially to FIGS. 1-3, the present invention is directed to a large industrial camera, projector or camera/projector of the type supported for movement along a track such as the overhead track generally designated by numeral 10. A generally rectangular subject holder 12 supports one end of the overhead track 10 and includes four upright posts 14. A pair of cross members 16 extend horizontally between the posts 14 parallel to the track 10 at locations near the top and bottom ends of the posts. Each post 14 is provided with a leveling pad 18 on its lower end. As best shown in FIG. 2, one end of the track 10 is supported on a pair of elevated braces 22 which extend transversely between the top ends of the posts 14. Another pair of transverse braces 23 (FIG. 3) extend between posts 14 near their bottom ends.

The subject holder 12 is constructed in a conventional manner and serves to hold original drawings or other materials that are to be reproduced by the camera. Back lighting can be provided in the compartment behind the material, and a vacuum system or the like (not shown) can be used to maintain the material in a flat condition.

The end of the track opposite the subject holder 12 is supported by a pair of upright posts 24 having a pair of cross members 26 and 27 extending between them. One cross member 26 extends between the top ends of the posts 24 and receives the end of the track 10. The other member 27 is located near the lower ends of posts 24. A pair of anti-sway bars 28 (FIG. 1) extend from the upper cross member 26 along the undersides of a pair of parallel beams 30 forming the main structural beams of the track 10. The anti-sway bars 28 extend toward the subject holder from cross member 26. Bolts or other fasteners (not shown) are used to secure the anti-sway bars 28 to the beams 30. A leveling pad 32 is provided on the bottom end of each post 24.

The beams 30 are rectangular tubes which extend parallel to one another along the entire length of the track 10. Beams 30 are connected by a cross beam 34 (see FIG. 3) which is welded to the back end of each beam. At their forward ends, beams 30 are connected by another cross beam 36 (see FIG. 2). A flat bar 38 (FIG. 2) extends between beams 30 at a location above one of the cross members 22 of the subject holder. The opposite ends of beams 30 are bolted or otherwise secured to cross members 22 and 26.

Figure 6:
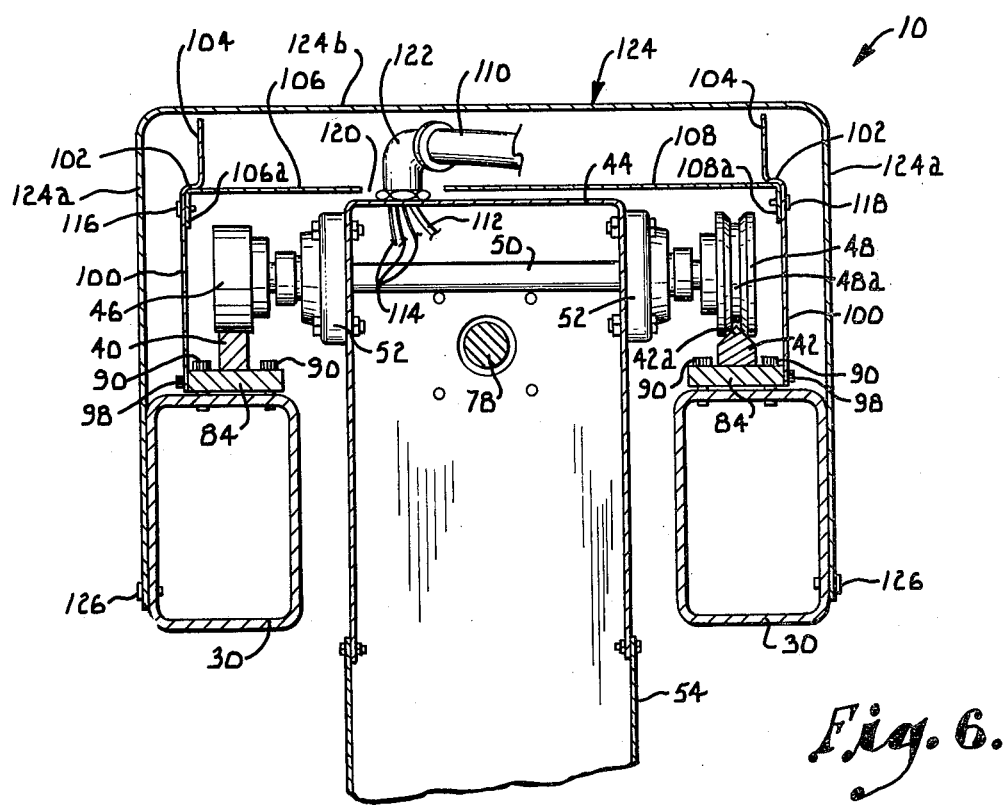
FIG. 6 is a fragmentary sectional view on an enlarged scale taken generally along line 6—6 of FIG. 4 in the direction of the arrows.

The beams 30 support parallel rails 40 and 42 on which a wheeled carriage 44 travels. As best shown in FIG. 6, rail 40 has a flat top, and carriage 44 has a pair of wheels 46 on one side which travel along the flat rail 40. Wheels 46 have flat or cylindrical peripheral surfaces which ride flatly along rail 40. The top of the other rail 42 tapers to a peak 42a, and the carriage 44 has a pair of grooved wheels 48 which travel along the peaked rail 42. Each wheel 48 has a peripheral groove 48a which mates with the shape of the peak 42a and fits closely thereon. The grooved wheels 48 are located on the opposite side of carriage 44 from the other wheels 46. Each set of wheels 46 and 48 is carried on a common axle 50 which extends through the carriage 44 and is supported by bearings 52 secured to the opposite side walls of the carriage. The close fit of grooves 48a on peak 42a maintains the grooved wheels 48 on the peaked rail 42 and thus guides the carriage along the straight path defined by rail 42.

The carriage 44 is a hollow, box-like structure which extends downwardly between the beams 30, as best shown in FIG. 6. On its lower end, carriage 44 carries an optical head having a housing 54 in which a vacuum pump, drive mechanism and various other components (not shown) such as electronic gear may be contained.

Referring now to FIG. 1 in particular, a flat horizontal plate 56 is secured to the bottom of the housing 54, and an optical compartment 58 is secured to the plate 56. The camera includes a film holder 60, a bellows 62, and a lens 64 all located in front of the optical compartment 58. A plate 66 extends upwardly in front of the bellows 62 and connects with blocks 68 which contain recirculating bearings and which travel along a horizontal shaft 70. The shaft is supported at its opposite ends by blocks 72. A drive mechanism (not shown) within the housing 54 drives the plate 66 and bearing blocks 68 back and forth along shaft 70 to expand and contract the bellows 62 for focusing of the camera on the material held by the subject holder 12.

As best shown in FIG. 2, the carriage 44 is driven back and forth along rails 40 and 42 by a stepping motor 74 mounted on a platform 76 supported on the beams 30. The stepping motor 74 rotates a threaded shaft 78 which extends from the motor and is supported at its opposite end by a bearing 80 mounted on the cross beam 34 at the back end of the track. Shaft 78 extends through carriage 44 and is threaded through an internally threaded ball nut 82 (see FIG. 5) which is secured to one end of the carriage. The nut 82 is secured against rotation. Consequently, when motor 74 is activated to rotate shaft 78, the shaft acts as a screw drive which moves carriage 44 back and forth along rails 40 and 42, with the direction of travel depending upon the direction shaft 78 is rotated. In this manner, the position of the carriage along the track is accurately controlled by motor 74.

In an alternative and optional drive arrangement, the threaded shaft 78 may be firmly held at its ends with clamping blocks (not shown) rather than by bearings 80, in which case the flange of the ball nut 82 would be secured to a pulley connected to the carriage 44. In such instance the ball nut would propel the carriage along the then static screw. This described alternative mode of propulsion of the carriage does not otherwise alter the mechanical features of this invention nor its general operation.

In accordance with the present invention, both rails 40 and 42 are adjustable with respect to the beams 30 on which the rails are supported. The adjustable mounting of only rail 42 will be described in detail, and it is to be understood that the other rail 40 is mounted in essentially the same manner. Each rail is secured on top of a base 84, and the bases 84 are in turn mounted on top of the respective beams 30. The bases 84 have greater widths than the rails 40 and 42, and each rail is centered on its base.

Referring now particularly to FIG. 7, rail 42 is secured on top of its base 84 by a plurality of socket head cap screws 86 which are threaded upwardly into the rail 42 at spaced locations along its length. Screws 86 are wholly recessed within rail 42 and base 84 and are accessible from the bottom of the base when same is detached from beam 30. Between each pair of screws 86, a plurality of dowels 88 (see FIG. 5) are pressed into openings in the rail 42 and base 84. These are inserted after it has been determined with optical tooling that the rail is straight and level as mounted on base 84. The bases 84 are then held down on the underlying beams 30 by a plurality of hold down screws 90 which are preferably socket head cap screws. The hold down screws 90 are arranged in pairs, with the screws in each pair located on opposite sides of the rail 42. The pairs of hold down screws 90 are spaced apart along the length of each rail.

Each hold down screw 90 extends through an opening 92 formed through base 84. Each opening 92 is elongated in a direction transverse to rail 42 to permit each base 84 to be adjusted in the transverse direction at each station defined at a pair of screws 90. The lower end of each hold down screw 90 is threaded into the underlying beam 30.

With reference now to FIG. 8 in particular, a plurality of adjustment screws 94 are threaded through each base 84. Each adjustment screw 94 preferably has a recess (such as an Allen recess) in its top end for receiving a wrench or other tool used to tighten and loosen the screw. A jam nut 96 is threaded onto each adjustment screw 94 and tightened down against the top surface of base 84 in order to prevent the adjustment screw from turning once the jam nut has been tightened. Each of the adjustment screws 94 extends downwardly below the bottom surface of base 84 and rests on top of the underlying beam 30 in order to space the base and rail 42 slightly above the beam. The distance between the beam and rail is determined by the distance which the screws 94 extend below the base.

As best shown in FIG. 5, the adjustment screws 94 are arranged in pairs, with each pair of screws being located on opposite sides of rail 42 and on opposite sides of the adjacent pair of hold down screws 90. The adjustment screws 94 provide for adjustment of the rails in order to assure that they are level in actual use, and the arrangement of the adjustment screws provide effective leveling.

With particular reference now to FIG. 6, the outside edge of each rail base 84 is secured by a plurality of screws 98 to the lower edge portion of a vertical panel 100. Each of the panels 100 is a metal panel which is turned inwardly at 102 and back upwardly to provide a flange 104 at the top portion of the panel.

A pair of horizontal plates 106 and 108 provide support for a pair of flexible cables 110 which contain vacuum lines 112 and/or electrical lines 114 which feed the components in the optical housing 54 and optical compartment 58. Plates 106 and 108 and panels 100 extend substantially the entire length of track 10. Plate 106 has a downturned flange 106a on its outer edge which is screwed at 116 to one of the panels 100 immediately below the offset 102. The other cable support plate 108 has a similar flange 108a which is screwed at 118 to the other vertical panel 100. The inner edges of plates 106 and 108 are spaced apart to provide an elongated slot 120 located above carriage 44 and extending substantially the entire length of the track 10. The offset portions 102 of panels 100 engage the corner portions of plates 106 and 108 to reinforce these areas of the cable support structure, while the flanges 104 extend above plates 106 and 108 to further stiffen the cable support structure and maintain the cables 110 on the cable support surface provided by plates 106 and 108 containing them as they move with the carriage and prevent fouling. The carriage 44 and rails 40 and 42 are enclosed by the cable support structure formed by panels 100, 106 and 108.

As best shown in FIG. 2, each cable 110 has a fixed end 110a and an opposite end which connects with an elbow fitting 122. The elbow fittings 122 are secured on the top panel of carriage 44 and travel with the carriage as it moves along the track. The fittings 122 extend through slot 120 and travel along the slot as the carriage moves back and forth along the track. The upper surfaces of plates 106 and 108 are low friction surfaces coated with silicone release agent, TEFLON material, or a similar low friction material. The plates 106 and 108 cooperate to provide a support surface on which the cables 110 slide as the moving ends at fittings 122 move back and forth along the length of track 10. The flanges 104 prevent the cables 110 from dropping off the outer edges of plates 106 and 108.

The track structure 10 is covered by a canopy generally designated by numeral 124. The canopy has the shape of an inverted U and includes parallel side panels 124a and a horizontal top panel 124b extending between the upper edges of the side panels. The lower edges of the side panels 124a are secured to the outside surfaces of beams 30 by a plurality of screws 126. The canopy 124 extends the entire length of the track and includes opposite end panels 128 and 130 (see FIG. 2). The canopy encloses all of the components of the track and carriage assembly.

In operation, the stepping motor 74 is selectively activated to drive carriage 44 back and forth along the rails 40 and 42 to position the camera at the proper distance from the subject which is held in the subject holder 12. The broken line positions of FIG. 1 illustrate the limiting positions of the camera, and when these positions are reached, limit switches (not shown) prevent motor 74 from continuing to drive the carriage.

As the carriage moves along the track, the heavy load that is applied thereto by the weight of the optical head and other components carried by the carriage tends to deflect beams 30 downwardly. The tendency for deflection to occur is greatest near the center of the beam which is most distant from the upright support posts 14 and 24 and the horizontal cross members 22 and 26. Downward deflection of track structure under load causes its lower portion to be stretched or extended and its upper portion to be compressed. The rigid plates 106 and 108 of the cable support structure oppose compression and thus resist the tendency for the beams to deflect downwardly. Similarly, the rigid top plate 124b of the canopy opposes compressive forces and assists in resisting beam deflection. The cable support structure and canopy stiffen the overall track arrangement and minimize deflection of the beams.

The beam deflection that does occur can be compensated for by properly adjusting the adjustment screws 94. For example, the adjustment screws near the center of the track should be extended downwardly below base 84 to a greater extent than the adjustment screws near the ends of the track. When not loaded, the rails 40 and 42 should be arched a few thousandths of an inch so that when the carriage moves along the rails applying downward force, the optical axis of the lens 64 is maintained in a constant horizontal attitude. This avoids the geometric distortion in the photographic image which would otherwise occur. The adjustment screws 94 can be adjusted after the track structure has been assembled and under conditions of actual loading so that the rails 40 and 42 are assured of being maintained in a level condition in actual use, thus keeping the optical axis of the camera level. Once all of the adjustment screws 94 have been properly adjusted, all of the hold down screws 90 are tightened down.

For accurate reproduction, it is also necessary for the rails 40 and 42 to extend horizontal, parallel to one another, and perpendicular to the plane of the material held in the subject holder 12. The elongated openings 92 through which the hold down screws 90 extend permit each base 84 to be adjusted sidewardly if necessary to maintain the rails in a straight and parallel condition. Suitable optical tooling instruments (not shown) can be used to measure the fidelity of the rails and assure that they extend in a straight path along the entire length of the track. The spacing of the adjustment screws 94 and hold down screws 90 at various locations along the entire length of the track permit the various portions of the rails to be adjusted independently. Once the rails 40 and 42 have been adjusted to a level condition and in a straight path parallel to one another under operational loading conditions, compensation is made for beam deflection to assure that undue distortion will not be introduced into the film image produced by the camera.

All of these fine adjustments and leveling operations can be observed with optical tooling instruments positioned at either end of the track with the end panels, the cable support assembly, and the canopy removed, and with magnetic targets affixed temporarily at any suitable position on the rails. During this procedure the carriage may be moved, deflection observed and fresh readings taken until a pattern of beam sag can be ascertained and the necessary compensating adjustments made. It is also noteworthy that once the entire beam assembly has been fine tuned geometrically, the canopy has been secured in place over it and the proliferation of screws 126 has been tightened in place, such tightening has the effect of adding the strength of the canopy to the remainder of the beam assembly and locking the adjustments permanently.

The use of one V-rail 42 and one flat rail 40 is not new in and of itself. However, in the present invention, each rail is supported on and bolted to a support base 84 such that the bases not only add strength to the rails but can be adjusted either by shimming or by using a multiplicity of bolts in combination to hold the bases together and at the same time thrust them apart to deliberately warp them into the desired straight configuration. Also, the bases of the rails are firmly affixed to the tops of the beams. To my knowledge, this combination has not been used in the past in a support structure for a moving camera.

The rails, while completely adjustable along their length from side to side and up and down at any given point, are part of the structure having a strength which is the total of the structural contributions from: the main structural framework, usually weldments; the rails and support flanges; the sheet metal cable support which as an entity comprises an inverted channel which is bolted to the rail and thus, in effect, to the weldment; and the canopy which covers all of the above components and is bolted to the outside of the main framework.

From a structural standpoint, when the load of the optical carriage or subject holder or other element is brought to bear on the beam, the following parts are subject to being stretched and resist beam sag by resisting extension: the bottom side of each piece of tubular steel in the main frame or weldment; the rail bases 84; the bottom of the side plates 100 of the inverted channel which comprises the cable support shell; the bottom of the side plates 124a of the outer or top canopy which is also an inverted channel; and the bolts 98 which hold the side plates of the cable support. The following parts tend to oppose sag in the beam structure by resisting compression: the topside or plane of each piece of tubular steel in the main framework or weldment; the upright portion of each rail, and particularly the top of each rail; the top plates 106 and 108 of the cable support shell; and the top plate 124b of the outer main canopy shell.

The involvement and interaction of each of these parts with all of the others is complex, but it can readily be appreciated that with all the welding, nesting and bolting of these elements together, the net result is an exceedingly strong carrying structure. When that strength is combined with the adjustable feature of the rails, it is possible to achieve accuracy of alignment previously unattainable.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompaning drawings is to be interpreted as illustrative and not in a limiting sense.

Having thus described the invention, what is claimed is:

1. In an optical system having an overhead beam providing a track supported at the ends, a subject holder at one end of the beam, a pair of elongate rails on the beam, a wheeled carriage riding on the rails toward and away from the subject holder, an optical instrument such as a camera suspended from the carriage, and means for driving the carriage along the rails to move the optical instrument toward and away from the subject holder, a leveling arrangement for the rails comprising:
   a plurality of hold down fasteners spaced along each rail for holding the rail down on the beam; and
   a plurality of adjustment screws spaced along each rail, each adjustment screw being threaded to the corresponding rail and having a lower end projecting below the rail and engaging the beam to space the rails above the beam, said adjustment screws being independently adjustable to vary the distance of each rail above the beam along the length of the rail, thereby permitting the rails to be maintained in a level condition as the carriage travels along them and the beam deflects under the influence of the load applied thereto by the carriage and instrument.

2. The invention of claim 1, wherein:
   each rail includes a rail member and an underlying base having a greater width than the rail member and rigidly secured thereto; and
   said hold down fasteners comprise hold down screws extending through openings in said bases and threaded to the beam.

3. The invention of claim 2, wherein said openings are elongated in a direction transverse to the bases to permit the bases to shift transversely on the beam when the hold down screws are loosened.

4. The invention of claim 2, wherein said adjustment screws are threaded through said bases on opposite sides of the rail members.

5. The invention of claim 4, including a jam nut threaded onto each adjustment screw and adapted to be tightened against the top of the corresponding base to lock the adjustment screw in place.

6. The invention of claim 2, wherein:
   said rail members are substantially centered on said bases; said bases extend beyond the rail members on opposite sides thereof;

said hold down screws are arranged in pairs with the hold down screws in each pair located on opposite sides of the rail members; and said adjustment screws are arranged alternately on opposite sides of the rail members.

7. In combination with a track mounted optical instrument such as a camera, the improvement comprising:

a subject holder for holding subjects of the optical instrument;

a pair of generally parallel support beams providing a track for the optical instrument;

upright support means supporting opposite ends of said beams to mount the beams at an overhead location in substantially horizontal extension toward and away from the subject holder;

an elongate rail on each beam;

a wheeled carriage riding on said rails toward and away from the subject holder, said carriage supporting the optical instrument in suspension therefrom to carry the instrument with the carriage toward and away from the subject holder;

power means for driving said carriage along said rails in opposite directions;

adjustable means for holding each rail down on the corresponding beam; and a plurality of adjustment members spaced along the length of each rail for controlling the distance of the rails above the beams, said adjustment members being independently adjustable to vary the spacing between the rails and beams along the length dimensions thereof in a manner to maintain each rail in a level condition as the carriage travels along the rails and the beam deflects under the influence of the load applied thereto by the carriage and optical instrument.

8. The improvement of claim 7, including:

at least one flexible cable for feeding power to the optical instrument, said cable having a fixed end and an opposite moving end connected with the carriage;

a generally horizontal cable support plate overlying said carriage and receiving said cable thereon, said plate having a low friction top surface to facilitate sliding of the cable thereon as the carriage travels along said rails;

an elongate slot in said cable support plate for accommodating movement of said moving end of the cable with the carriage; and a pair of generally vertical panels rigidly connected with said cable support plate to secure same above the carriage, said panels having lower ends rigidly connected with the respective rails, whereby resistance of the cable support plate to compression opposes downward deflection of said rails to stiffen the beams and reduce deflection thereof under loading.

9. The improvement of claim 8, including a rigid canopy having opposite side panels rigidly secured to the respective beams and a top panel extending rigidly between said side panels at a location to overlie said cable support plate, said top panel resisting compression to oppose downward deflection of said beams.

10. The improvement of claim 8, wherein each rail includes a rail member and an underlying base having a greater width than the rail member and rigidly secured thereto, said lower ends of said vertical panels being secured to said bases.

11. The improvement of claim 10, including a plurality of screw fasteners securing the lower ends of said vertical panels to said bases.

12. The improvement of claim 7, wherein:

one of said rails has a top surface presenting a longitudinal peak thereon and the other of said rails has a generally flat top surface; and said carriage includes one set of wheels having a grooved periphery riding on said one rail and another set of wheels having a flat periphery riding on the other of said rails.

13. The improvement of claim 7, wherein:

each rail includes a rail base and a rail member rigidly secured on top of said rail base with the base projecting on opposite sides of the rail member; and said adjustable means comprises a plurality of hold down screws spaced along the length of each rail base and fastening the rail base to the corresponding beam at locations on opposite sides of the rail member.

14. The improvement of claim 13, wherein said adjustment members comprise adjustment screws threaded through said rail bases on opposite sides of the rail member and each having a lower end projecting below the rail base and resting on the corresponding beam to support the rail base thereon.

15. Apparatus for supporting an optical instrument such as a camera, said apparatus comprising:

a subject holder for holding subjects of the optical instrument;

a pair of generally parallel beams providing an overhead track extending toward and away from the subject holder;

upright support posts supporting opposite end portions of said beams at locations adjacent the subject holder and remote therefrom;

an elongate rail on each beam;

a wheeled carriage riding on said rails toward and away from the subject holder;

means extending downwardly between said beams for suspending the optical instrument from said carriage to carry the instrument with the carriage toward and away from the subject holder;

means for driving the carriage along said rails in opposite directions; and a rigid canopy having opposite side panels secured at lower ends thereof to said beams and a top panel extending between said side panels at upper ends thereof to cover said carriage and drive means, said top panel resisting compressive forces to oppose downward deflection of said beams between the opposite ends thereof.

16. Apparatus as set forth in claim 15, including a pair of longitudinal anti-sway bars extending beneath the respective beams and secured thereto, said bars extending from the support posts remote from the subject holder toward the support posts adjacent the subject holder.

17. Apparatus as set forth in claim 15, including:

at least one flexible cable having a fixed end for receiving power and an opposite end connected with said carriage for directing power to the optical instrument;

a pair of generally vertical plates secured at lower end portions thereof to the respective rails and extending within the canopy;

a pair of cable support plates secured to the respective vertical plates at upper end portions thereof and extending inwardly toward one another to provide a generally horizontal cable support surface for supporting said cable and permitting same to slide as the carriage moves along said rails;

said cable support plates terminating in spaced apart edges defining a slot therebetween accommodating movement of said opposite end of the cable as the carriage moves along the rails; and said cable support plates resisting compressive forces to cooperate with said top panel in stiffening the beams and rails and opposing downward deflection thereof.

18. Apparatus as set forth in claim 17, wherein the upper end portions of said vertical plates extend above the cable support plates.

19. Apparatus as set forth in claim 17, including a low friction coating on said cable support surface to facilitate sliding of the cable thereon.

20. Apparatus as set forth in claim 15, including a plurality of screw fasteners securing said lower ends of the canopy side panels to said beams.

* * * * *